(12) United States Patent
Craig, Jr.

(10) Patent No.: US 6,240,603 B1
(45) Date of Patent: Jun. 5, 2001

(54) HOSE CLAMP WITH STEPLESS INTERNAL CLAMPING SURFACE AND METHOD OF MAKING THE SAME

(76) Inventor: Paul M. Craig, Jr., 207 Quaint Acres Dr., Silver Spring, MD (US) 20904

(*) Notice: Subject to any disclaimer, the term of this patent is extended or adjusted under 35 U.S.C. 154(b) by 0 days.

(21) Appl. No.: 09/689,625

(22) Filed: Oct. 13, 2000

Related U.S. Application Data

(60) Provisional application No. 60/208,038, filed on May 31, 2000.

(51) Int. Cl.$^7$ .................................................. F16L 33/02
(52) U.S. Cl. ................................................... 24/20 CW
(58) Field of Search .................. 24/20 R, 20 CW, 24/20 EE, 23 W, 20 W, 23 EE, 20 TT, 23 R, 19

(56) References Cited

U.S. PATENT DOCUMENTS

| | | | |
|---|---|---|---|
| Re. 33,639 | * | 7/1991 | Oetiker . |
| 4,299,012 | * | 11/1981 | Oetiker . |

* cited by examiner

*Primary Examiner*—James R. Brittain

(57) ABSTRACT

A clamp made from clamping band material in which optimization for the length of the necessary blank is realized in dependence on the length of the bridging portion of a so-called "Oetiker" ear whereby this bridging portion length is used to determine the length of the overlapped full-band-width inner clamping band portion as well as the location of the beginning of the step-like portion and the length of the tongue-like extension at the end of the full-band-width inner clamping band portion.

16 Claims, 4 Drawing Sheets

HOSE CLAMP WITH STEPLESS INTERNAL CLAMPING SURFACE AND METHOD OF MAKING THE SAME

This application claims the benefit of U.S. Provisional Application No. 60/208,038 filed May 31, 2000.

FIELD OF THE INVENTION

The present invention relates to hose clamps provided with internal clamping surfaces devoid of any step, discontinuity or gap and to a method for determining optimum length of the blanks for such hose clamps.

BACKGROUND OF THE INVENTION

With the use of new, relatively harder and thinner plastic hose materials, it became essential with so-called open hose clamps made from galvanized or stainless steel band material to provide internal clamping surfaces devoid of any step, gap or discontinuity, particularly at the end of the inner overlapped clamping band portion. Equally important remained the need to prevent the deflection or escape of the underlying inner band portion into the ear during plastic deformation of the ear and to reliably bridge any remaining gap underneath the plastically deformed ear of a so-called "Oetiker" ear. An effective solution which proved commercially immensely successful and which was used in hundreds of millions of clamps is described in U.S. Patent 4,299,012 which, as shown in FIG. 1 of this application and corresponding to FIG. 19 of this patent, includes a narrow tongue-like extension (61) at the end of the full-width inner band portion (11b) adapted to engage through an opening (62) that commences in the outer band portion (11a) at the beginning of a step-like portion (67). In addition to a typical "Oetiker" ear generally designated by reference numeral (13), which consists of two parallel outwardly extending leg portions 14 and 15 interconnected by a bridging portion (16) and provided with a reinforcing groove (17), FIG. 1 also shows the then-improved mechanical connection consisting of a so-called guide or suspension hook (31) and of two cold-deformed, deep-drawn support hooks (32) adapted to engage in apertures (35) in the outer band portion (11a) as also more fully described in the aforementioned U.S. Pat. No. 4,299,012. According to this patent, a channel is formed by the cuts for the elongated opening and by then pressing-out the center part (63) extending over and externally covering the tongue-like portion (61). However, the cover (63) can also be omitted by simply cutting off the material forming the opening so that the tongue-like extension (61) is then freely exposed to the outside as disclosed in U.S. Pat. No. 4,315,348 and as shown in FIG. 2 herein, corresponding to FIG. 12 of this last-mentioned patent. Reference numeral (20) also generally designates in FIG. 2 a different type of connection with the use of a tab-like member (20) bent-out from the inner band portion (11b) and extending through a corresponding aperture in the outer band portion (11a).

With annual productions of clamps utilizing these features exceeding several 100 millions per year, it is of interest to analyze these clamps with a view to rationalize production in order to cut material costs involving the clamping band as such. In other words, even small amounts in the length of the blank of clamping band required for a given size clamp become significant. For example, with a saving of as little as 0.25 inches in the average overall length of the blank, such saving is significant with a production of 100,000,000 clamps a year in which case the total savings would be 25,000,000 inches or 283,333 feet or 94,444 yards.

SUMMARY OF THE INVENTION

It is therefore a principal object of the present invention to provide a clamp having an internal clamping surface devoid of any gap, discontinuity or step which optimizes the length of the blank necessary for making a given clamp size.

According to this invention, this is achieved by determining the minimum length of the blank of clamping band necessary to achieve reliable operation of the clamp which involves locating certain key points of the clamp at well-defined, readily ascertainable distances. This includes locating the end of the full-width inner clamping band portion at a small distance from the one of the leg portions of the pair of leg portions of the plastically deformable ear away from the free end of the outer clamping band portion and to coordinate the location of the step-like portion and the length of the tongue-like portion in dependence of the length of the gap underneath the ear in its non-deformed condition.

BRIEF DESCRIPTION OF THE DRAWINGS

These and further objects, features and advantages of the present invention will become more apparent from the following description when taken in conjunction with the accompanying drawings which show, for purposes of illustration only, one embodiment in accordance with the present invention, and wherein.

DETAILED DESCRIPTION OF THE DRAWINGS

Figure 1:
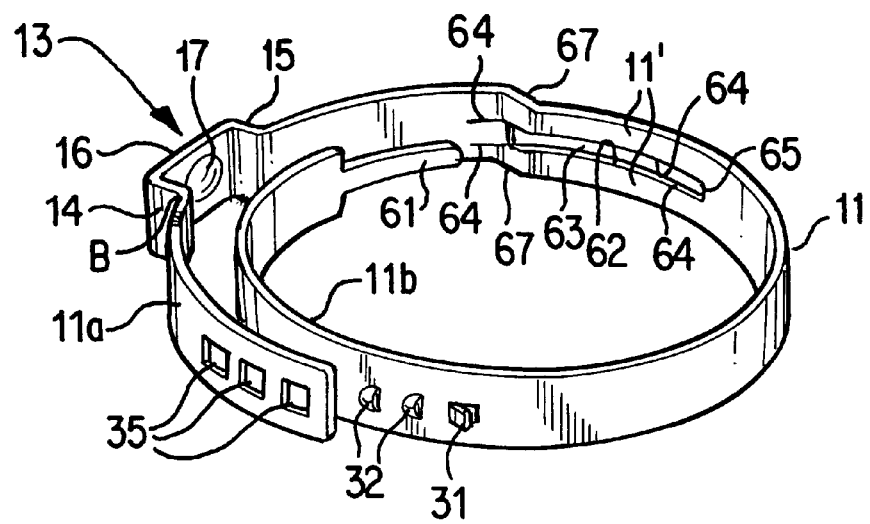
FIG. 1 is a perspective view of a prior art clamp of the type disclosed in U.S. Pat. No. 4,299,012.
Figure 2:
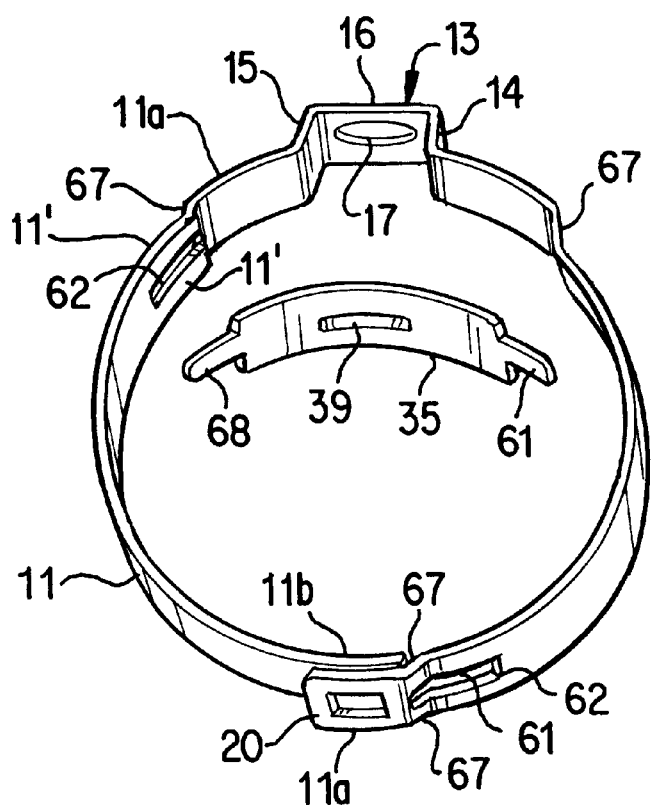
FIG. 2 is a perspective view of a prior art clamp as disclosed in U.S. Pat. No. 4,315,348.
Figure 3:
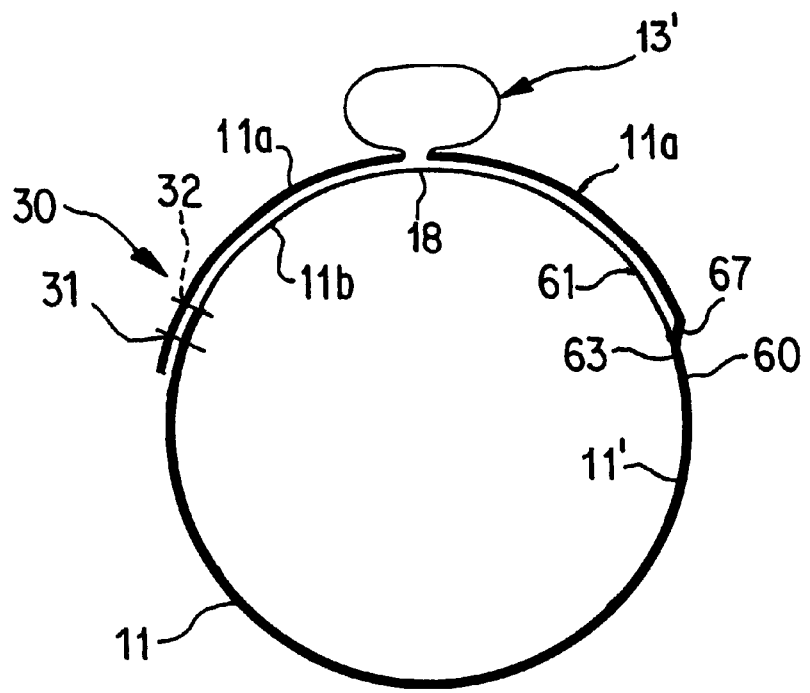
FIG. 3 is a schematic axial view of a clamp with an already plastically deformed "Oetiker" ear and illustrating in heavy lines the parts of the clamp under tensional stresses.

Referring now to the drawing wherein like reference characters are used throughout the various views to designate like parts, FIG. 3 illustrates schematically a tightened clamp with a plastically deformed ear generally designated by reference numeral 13'. The hose and nipple are omitted for the sake of clarity. In FIG. 3, the parts which are under tensional stress in the tightened condition are shown in heavy lines. As a clamp of a given nominal size must cover a certain range of tolerances of the hose and nipple, it is assumed in FIGS. 3 and 4 that both the hose and nipple (not shown) have outer diameters greater than the minimum dimensions in the tolerance range but smaller than the maximum dimensions so that a small gap remains underneath the plastically deformed ear 13'. Omitting any stresses which exist in the plastically deformed ear 13', the parts of the clamp under tensional stress in the tightened condition can be traced as follows: starting from the right inner end of the plastically deformed ear 13', as viewed in FIG. 3, the path of the tensional stresses can be traced in the clockwise direction through the outer band portion 11a, the step-like portion 67, the lateral remaining band portions 11', the clamping band 11 up to the mechanical connection generally designated by reference numeral 30 which includes, for example, a so-called guide hook 31 and one or more deep-drawn support hooks 32, and from there through the outer band portion 11a up to the inner end of the left leg portion of the plastically deformed ear. These tensional forces, caused by a reduction of the diameter of the clamp as a result of the plastic deformation of the ear, in turn, produce the radially directed clamping forces.

Figure 4:
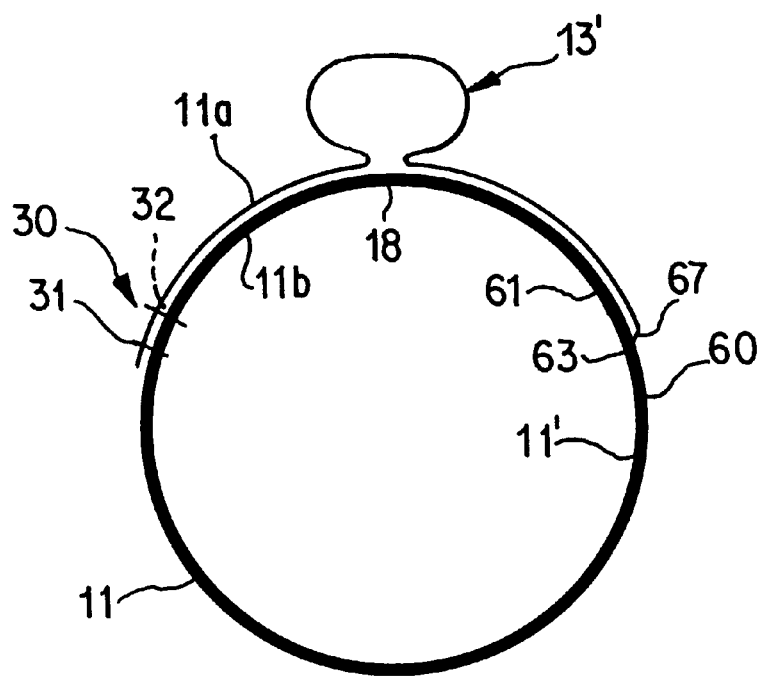
FIG. 4 is a somewhat schematic axial view of a clamp with a plastically deformed "Oetiker" ear, similar to FIG. 3, and illustrating in heavy lines the internal clamping surfaces producing the holding force on the hose.

Turning next to FIG. 4 which illustrates in heavy lines the parts of the clamp producing the radial clamping forces, the clamping surfaces which produce these radially directed clamping forces can be traced from the point of the beginning of overlap of the inner clamping band portion 11b, coinciding with the free end of the outer clamping band end portion, to the tongue-like extension 61, the remaining lateral portions 11', the main clamping band 11 and back to the point of beginning of the overlap of the inner clamping band portion 11b. This analysis indicates that the inner clamping band portion 11b to the right of the mechanical connection 30, 31, 32 as viewed in FIGS. 3 and 4 as well as the tongue-like extension 61 are substantially without any tensional stresses and therefore depend for producing the necessary clamping forces on the tensional stresses in the overlapping outer band portion 11a. This also explains why any gap underneath the plastically deformed ear, no matter how small, must be covered by the full band width of the inner clamping band portion in order to minimize the likelihood of a deflection or escape of the inner clamping band portion into such a gap which might cause leakages.

Figure 5:
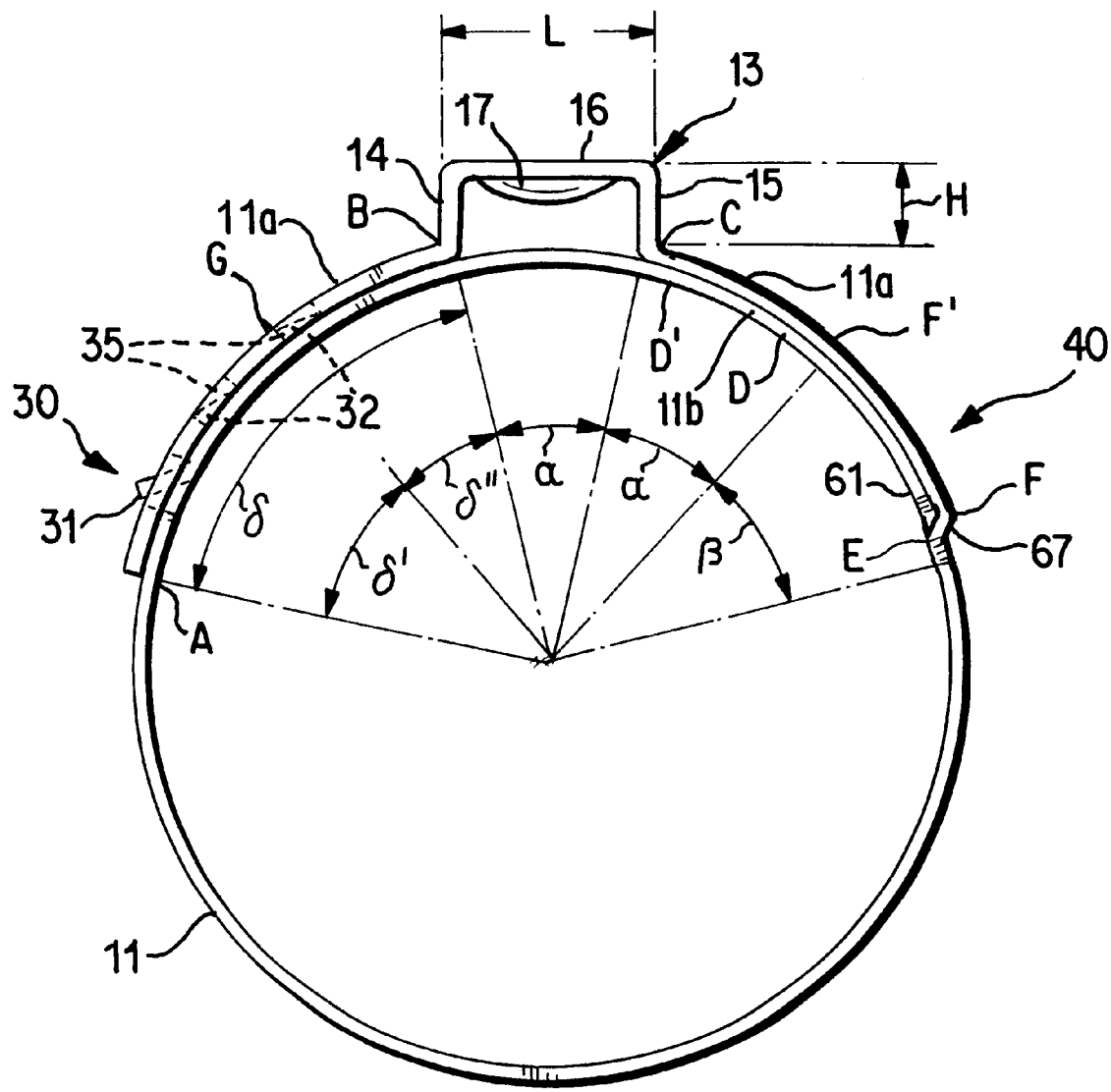
FIG. 5 is a somewhat schematic axial view of a clamp with the hook-like members in the inner clamping band portion of the mechanical connection engaging in apertures of the outer clamping band portion and with the ear in the not-yet-tightened condition corresponding generally to FIG. 7 of U.S. Pat. No. 4,299,012 and illustrating a prior art clamp.

Turning next to FIG. 5, the following key points will be used in discussing the present invention. Reference character A designates the beginning of overlap between inner and outer band portions 11b and 11a that starts with the free end of the outer band portion 11a. Reference characters B and C designate, respectively, the inner ends of the leg portions 14 and 15 at their connections with the outer band portion 11a. Reference character D designates the end of the full-width inner band portion 11b and the beginning of the tongue-like extension 61, reference character E the end of the tongue-like extension 61 and reference character F the beginning of the step-like portion 67. The maximum contraction of the ear 13 producing the maximum reduction in the diametric dimension of the clamp also corresponds to the maximum plastic deformation of the ear. This occurs when the inner ends B and C of the leg portions 14 and 15 come in contact with one another. The maximum reduction in diameter of a given size clamp is therefore substantially equal to the spacing between the leg portions of the non-deformed ear less twice the thickness of the clamping band. In order to assure that the hose is securely fastened even when the hose diameter and nipple diameter have minimum external diametric dimensions within a given tolerance range for a given clamp size, it is necessary that this takes place on or before the inner ends of the plastically deformed leg portions come in contact with one another.

On the assembly line, the pneumatically actuated pincer-like tools will always deform the ear with a constant force to produce a constant clamping force regardless of the actual external dimensions of the hose and of the nipple. As a given clamp size is intended to cover a certain tolerance range, it is not unlikely that a small gap remains underneath the ear. As mentioned before, it therefore becomes important that the gap underneath the ear be bridged by the full band width of the inner clamping band because a narrow tongue-like extension is far more likely to yield and escape into the gap as a result, for example, of thermal expansion or increases in internal pressures. With relatively hard and thin plastic hoses, this is likely to produce a leakage place, and this is why the German Gebrauchsmuster GM 75 41 277, in which any gap can be bridged only by the narrow tongue-like extension does not meet these important requirements.

The upper limit of the tolerance range of a clamp of nominal clamp size is reached when the forces of the pincer-like tool still produce the minimum necessary plastic deformation of the ear 13. In other words, the outside diameter of the hose and/or of the nipple cannot be so large that the tightening forces no longer produce a plastic deformation of the ear 13, normally of approximately omega shape. With proper application of the tightening tool at points B and C, it can further be assumed that the inner ends of the leg portions 14 and 15, i.e., points B and C, move toward one another by equal amounts. Theoretically it would therefore be sufficient to terminate the full band width of the inner band portion 11b at point C or even slightly ahead of point C as point C, during plastic deformation of the ear 13, moves counterclockwise toward the left, as viewed in FIG. 5, while point B moves clockwise toward the right so that the end of the full band width of the inner band portion would also move in the clockwise direction. However, these assumptions may not always hold true, for instance, in case of unequal force application of the tightening tool at points B and C, differing friction occurring in different parts of the inner clamping surface and clamping forces that are not completely equal over the entire circumference of the inner clamping surfaces. It is therefore desirable for the sake of proper operation of the clamp under all conditions, to extend the full band width of the inner clamping band 11b to terminate a slight distance clockwise beyond point C.

The foregoing indicates that the full width inner band portion should be of sufficient length to bridge the gap underneath the ear 13 when the mechanical connection 30, 31, 32 is already engaged but before the ear is plastically deformed. This is achieved in the prior art clamp of FIG. 5 by a length of the full-width inner clamping band portion 11b which extends a substantial distance C-D beyond the leg portion 15. The tongue-like extension 61 has a length from point D to point E in order to extend through the opening in the step-like portion 67 which itself is located in the prior art clamp at an unnecessary great distance D-F from point D. The distances C-D, D-E as also D-F in the prior art clamp, however, are not limited to optimum size. As the length of the arcs can also be expressed in terms of the angle subtended thereby, the arc of the inner clamping band portion 11b underneath the non-deformed ear 13 subtends an angle α so that its length is equal to $$\frac{2\pi r \times \alpha}{360},$$

where r is the given radius of the clamp. By the same token, the arc of the inner clamping band portion 11b from point C to point D would be equal in the prior art clamp to $$\frac{2\pi r \times \alpha'}{360}$$

and the length of the arc of the tongue-like extension 61 would be $$\frac{2\pi r \times \beta}{360}.$$

The overall length of the inner clamping band portion would therefore be, beginning at point A, equal to $$\frac{2\pi r(\delta + \alpha + \alpha' + \beta)}{360},$$

where δ is the length of the arc from point A to point B. If one assumes that the length of the arc from points B-C is equal to the length L and omitting, in turn, the extra clamping band length due to the step-like portion, then the length of the blank required for a given prior art clamp size of radius r is equal to $$2\pi r + \frac{2\pi r \times (\delta + \alpha + \alpha' + \beta)}{360} + 2H,$$

where H is the height of the ear.

Figure 6:
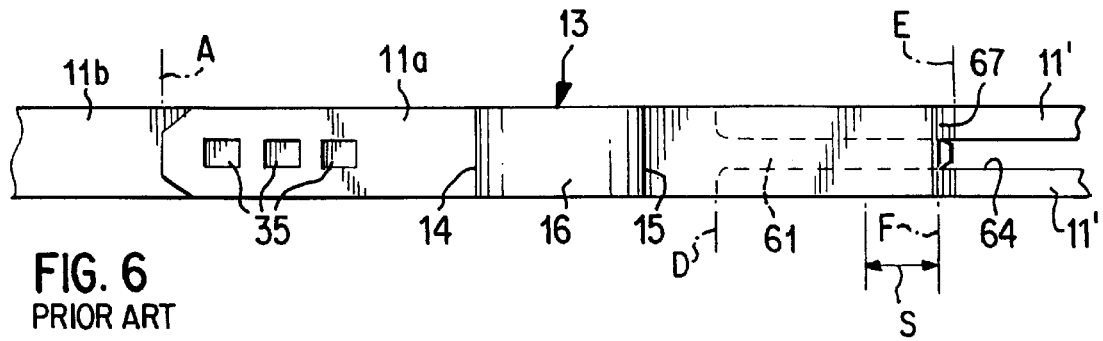
FIG. 6 is a partial schematic plan view, flattened out for better understanding, on the area including the mechanical connection, the plastically deformable ear, the end of the full-width inner band portion and the end of the tongue-like extension of a prior art clamp with the hook-like member in the inner clamping band portion of the mechanical connection engaging in apertures of the outer clamping band portion and with the ear in the not-yet-tightened condition.
Figure 7:
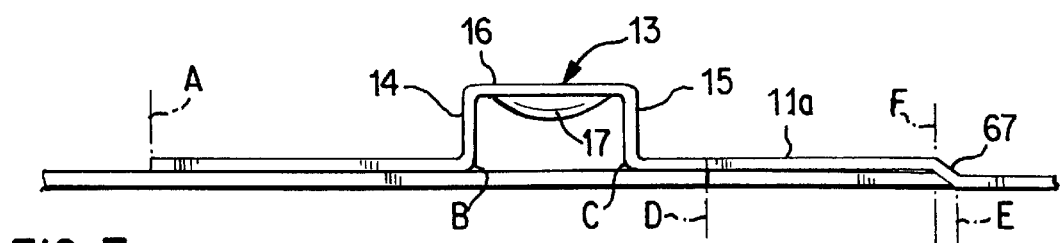
FIG. 7 is a partial schematic side elevational view of FIG. 6.

FIGS. 6 and 7 illustrate a prior art clamp which requires a length of blank as determined by the above equation that utilizes excessive clamping band material.

This is so as the full-width inner clamping band portion only needs to extend to a point just beyond point C, indicated in FIG. 5 by point D', thereby saving the clamping band material from point D' to point D. Similarly, the point F of the beginning of the step-like portion 67 only needs to be located a distance from point D' sufficient to allow the end of the full band width inner clamping band portion to end just ahead of the beginning of the step-like potion 67 when the ear has been plastically deformed to the maximum possible extent. This means that the distance D-F can be shortened to correspond to the distance B-C or to a distance slightly larger than B-C as a safety precaution. In other words, the angles α' and β can be reduced according to this invention as the tongue-like extension only needs to extend a small distance beyond point F'.

According to this invention, a considerable saving in the required length of the blank is achievable by locating the point D close to the point C as there is no need for proper functioning of the clamp to have considerable overlap between the outer clamping band portion 11a and the inner clamping band portion 11b beyond the point C. By the same token, as the maximum plastic deformation of the ear 13 is limited by the contact of the inner ends of leg portions 14 and 15, the beginning F of the step-like portion 67 only needs to be located at a point F' which is located at a distance B-C from the point D' or for precautionary reasons, only a distance slightly greater than B-C. The tongue-like portion 61 can then also be reduced to the distance D'E' (FIG. 18).

Figure 8:
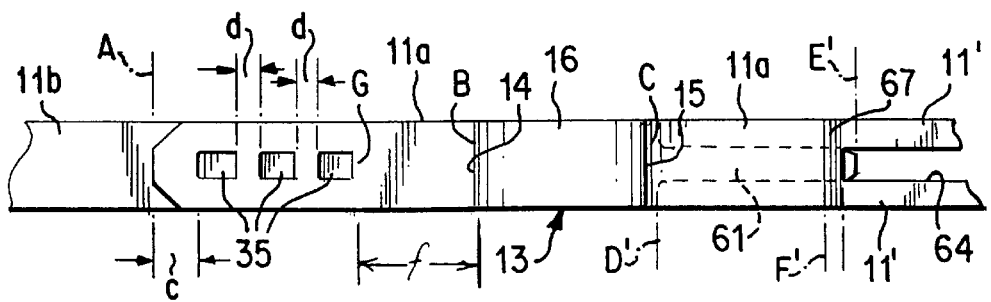
FIG. 8 is a partial schematic plan view, similar to FIG. 6 and illustrating the present invention.
Figure 9:
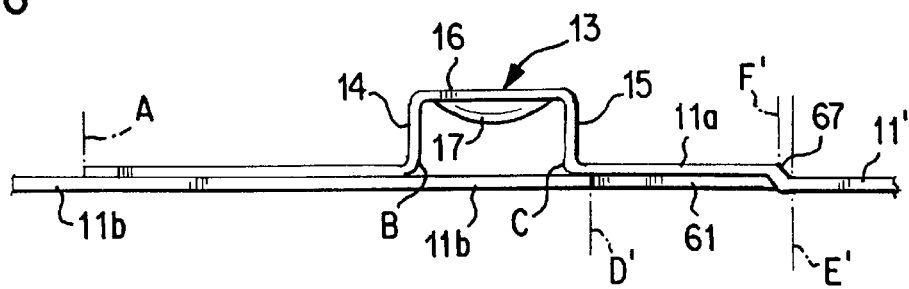
FIG. 9 is a side elevational view of FIG. 8.

Looking at a comparison of FIGS. 6 and 7, on the one hand, illustrating a typical prior art clamp, and FIGS. 8 and 9, on the other, illustrating the present invention, a saving of blank material equal to S (FIG. 6) is attainable with this invention.

As mentioned before, the angle α' only needs to be large enough to assure that the full band width of the inner band portion 11b extends to a point schematically indicated at D' in FIG. 5. The angle α' which may approach the value zero, in accordance with this invention may be as a precaution between about 0.02 to about 0.15, the value of a depending on the size of the clamp as the length of the arc is a direct function of the radius of the clamp. The point F', corresponding to the beginning of the step-like portion 67, only needs to be located at a distance from point D' to be equal to the angle a or slightly larger for precautionary reasons to assure that the end of the full-width inner band portion 11b finds itself at or slightly ahead of the step-like portion 67 in case of maximum plastic deformation of the ear. The length of the tongue-like portion 61, i.e., angle β then only needs to be of a size sufficient to extend just through the opening in the step-like portion, as measured from the point D' which means that the angle β should be larger than the angle α, for example, by an amount of about 0.1 to about 0.25 times the angle α.

The angle δ from the point A to the point B can be subdivided into the angle δ' and δ", whereby the angle 6' subtends the arc from the point A to the point G, i.e., the arc from the free end of the outer band portion 11a to the edge of the last aperture 35 away from the free end of the outer band portion. The length of this arc is thereby determined by the mechanical connection used, i.e., the type of hooks and the number of apertures as well as by the material used with the clamp, i.e., thickness and type of material as well as the maximum stresses in the circumferential direction expected in the clamping band. In other words, the distances d (FIG. 8) of the web portions between adjacent apertures 35 must be sufficient to avoid tearing out of the material. The same is also true of the distance from the edge nearest the free end of the outer band portion of the first aperture and the end of the outer band portion. With respect to the length f between points G and points B of the clamp, no specific requirements exist, as such, from a strength of material point of view. However, the length f, i.e., angle δ" must be sufficient to permit application of the jaws of the pincer tool without interference with the mechanical connection. At any rate, the angle δ" can be significantly smaller than the angle δ' and the optimum values can be empirically determined or calculated for a given size and given material as well as predetermined clamping forces required of the clamp.

The method of determining optimum length for a so-called stepless clamp of a given size can then be determined according to this invention in dependence on the arc subtended by the inner ends B, C of the leg portions 14, 15 or on the length L of the bridging portion which can be assumed to correspond or be almost equal to a safe distance B-D' such that the full-width inner clamping band portion extends beyond the gap underneath the non-deformed ear, when the mechanical connection is engaged. This assumption is based on the fact that maximum plastic deformation of the ear 13 is limited by two times the clamping band thickness. If necessary, a distance only slightly greater than this distance L can be chosen as a precautionary measure while the tongue-like extension then has a length D'-E' extending only a small distance beyond the opening in the step-like portion whose beginning F' is located at a distance from the end D' of the full-width inner band portion about equal to or only slightly larger than the distance L.

Reference to the length L of the bridging portion in this application assumes that the leg portions 14 and 15 are rectilinear and parallel. However, in case these leg portions are non-parallel and/or non-rectilinear, as disclosed in the co-pending application Ser. No. 09/504,850, filed Feb. 16, 2000, the entire subject matter of which is incorporated herein by reference, it is the spacing from one another of the inner ends of the leg portions at their connections with the clamping band that should be considered as the significant dimension in lieu of the length L of the bridging portion, and any reference in this description or in the claims should be so interpreted.

As the required circumference for a given clamp size is fixed by the equation $2\pi r$, this invention proposes a solution for optimization of the necessary length of the blank by recognizing that this can be achieved only by applying certain limitative criteria to the area of overlap between inner and outer band portions and that this can be done as a function of the spacing of the inner ends of the leg portions of the plastically deformable ear.

While I have shown and described only one embodiment in accordance with the present invention, it is understood that the same is not limited thereto but is susceptible of numerous changes and modifications as known to those skilled in the art. For example, this invention can be used with any clamp having an "Oetiker" ear and the aforementioned structural features to avoid any step, gap or discontinuity in the internal clamping surfaces or the analogous structural features, for example, as disclosed in the European Patent 0 243 224. Additionally, the tongue-like extension may be convexly shaped in transverse cross section which permits a slightly narrower opening in the step-like portion and a corresponding slight increase in the width of the clamping band parts on each side of the opening which have to absorb the maximum tensional stresses occurring in the clamping band, when tightened. I therefore do not wish to be limited to the details shown and described herein but intend to cover all such changes and modifications as are encompassed by the scope of the appended claims.

What is claimed is:

1. An open clamp comprising a clamping band having overlapping inner and outer clamping band portions, a mechanical connection for connecting overlapping band portions, a tightening device for reducing the diametric dimension of the clamp to tighten the clamp about an object to be fastened thereby, said tightening device including an ear having two leg portions and open at the inner end thereof to form a gap which is to be bridged by the full band width of the inner clamping band portion when the clamp is tightened, the inner ends of said leg portions being spaced from one another a first distance when the clamp is in the non-tightened condition, the end of the full width inner band portion being provided with an arrangement eliminating a step at the end of the full-width inner band portion, wherein the full width of the inner band portion terminates at a point located at most a small distance beyond the connection of the inner end of the one of the two leg portions further away from the free end of the outer band portion when the clamp is in the non-tightened condition while the connection is engaged.

2. A clamp according to claim 1, wherein said arrangement includes a step-like portion in the outer clamping band potion, and wherein said step-like portion is located from the end of the full width inner band portion by a distance slightly greater than the maximum reduction in the circumferential direction of the clamping surface obtainable by said tightening device.

3. A clamp according to claim 1, wherein said small distance is equal to about 0.05 to about 0.15 times said first distance.

4. A clamp according to claim 3, wherein the length of a blank for a clamping having a radius r is equal to the following equation $$2\pi r + \frac{2\pi r(\delta + \alpha + \alpha' + \beta)}{360} + 2H,$$

where $\delta$ is the angle subtended by the length of the clamping band from the free end of the outer clamping band portion to the inner end of the other of said pair of leg portions, $\alpha$ is the angle subtended by said first distance, $\alpha'$ is the angle subtended by said small distance, $\beta$ is the angle subtended by the length of the clamping band portion from the end of the full-width inner band portion to the end of the inner band portion, and H is the height of ear.

5. A clamp according to claim 1, wherein said connection includes at least one outwardly extending hook in said inner band portion adapted to engage in at least one aperture in said outer band portion, and wherein the transverse edge of the last of said apertures away from the free end of the outer band portion is spaced from the other leg portion of said two leg portions by a distance at most equal to about said first distance.

6. An open clamp comprising a clamping band having full-band width overlapping inner and outer clamping band portions, a connection for connecting overlapping band portions, tightening means for reducing the diametric dimension of the clamp to tighten the clamp about an object to be fastened thereby, said tightening means including a plastically deformable ear forming a gap on the inside thereof and having a pair of outwardly extending leg portions interconnected by a bridging portion extending in the longitudinal direction of the clamping band, the inner ends of said leg portions being spaced from one another a first predetermined distance when said clamp is in the non-tightened condition and the connection is engaged, and an arrangement providing an inner clamping surface devoid of any steps, gaps or discontinuities in the clamping surface, wherein in the non-tightened condition of the clamp with the connection engaged, the full width of the inner band portion extends beyond the inner end of the one of the pair of leg portions further away from the free end of the outer band portion by only a small distance.

7. A clamp according to claim 6, wherein said small distance is equal to about 0.05 to about 0.15 times said first distance.

8. An open clamp comprising a clamping band having full-band width overlapping inner and outer clamping band portions, a connection for connecting overlapping band portions, tightening means for reducing the diametric dimension of the clamp to tighten the clamp about an object to be fastened thereby, said tightening means including a plastically deformable ear forming a gap on the inside thereof and having a pair of outwardly extending leg portions interconnected by a bridging portion extending in the longitudinal direction of the clamping band, the inner ends of said leg portions being spaced from one another a first predetermined distance when said clamp is in the non-tightened condition and the connection is engaged, and an arrangement providing an inner clamping surface devoid of any steps, gaps or discontinuities in the clamping surface including a tongue-like extension at the end of said inner clamping band portion and a step-like portion in the outer clamping band portion having a radial height substantially corresponding to the thickness of the clamping band and provided with an opening of such size that said tongue-like extension can extend therethrough, wherein in the non-tightened condition of the clamp with the connection engaged, the full width of the inner band portion extends beyond the inner end of the one of the pair of leg portions further away from the free end of the outer band portion by only a small distance.

9. A clamp according to claim 8, wherein said small distance is equal to about 0.05 to about 0.15 times said first distance.

10. A clamp according to claim 8, wherein the length of said tongue-like extension is greater than said first distance by an amount equal to about 0.15 to about 0.2 times said first distance.

11. A clamp according to claim 8, wherein the length of a blank for the clamp having a radius r is equal to the following equation $$2\pi r + \frac{2\pi r(\delta + \alpha + \alpha' + \beta)}{360} + 2H,$$

where δ is the angle subtended by the length of the clamping band from the free end of the outer clamping band portion to the inner end of the other of said pair of leg portions, α is the angle subtended by said first distance, α' is the angle subtended by said small distance, β is the angle subtended by the length of the band portion from the end of the full-width inner band portion to the end of the tongue-like extension and H is the height of the bridging portion.

12. A clamp according to claim 8, wherein said connection includes at least one outwardly extending hook in said inner band portion adapted to engage in at least one aperture in said outer band portion, and wherein the transverse edge of the last of said apertures away from the free end of the outer band portion is spaced from the other leg portion of said pair of leg portions by a distance at most equal to about said first distance.

13. A method for optimizing the length of a blank necessary for a hose clamp made from band material and including a connection for connecting overlapping band portions, an ear-like tightening device forming a gap on the inside thereof and including a pair of leg portions interconnected by a bridging portion of predetermined length in the non-tightened condition of the clamp, with the overlapped full-width inner band portion bridging any gap underneath the ear-like tightening device, and an arrangement for avoiding any step, gap or discontinuity in the clamping surfaces of the clamp including a tongue-like extension at the end of the inner clamping band portion adapted to extend through an opening in a step-like portion of the outer clamping band portion, comprising the steps of determining the end of the overlapped full-band-width inner band potion as a function of the length of said bridging portion.

14. A method according to claim 13, further comprising the steps of determining the location of the step-like portion relative to the end of the full-band-width inner clamping portion and the length of the tongue-like extension as a function of the length of said bridging portion.

15. A blank for a clamp made in accordance with claim 14.

16. A blank for a clamp made in accordance with claim 13.

* * * * *